B. G. LAMME.
SYSTEM OF DISTRIBUTION AND CONTROL.
APPLICATION FILED MAR. 23, 1914.
1,246,617.
Patented Nov. 13, 1917.
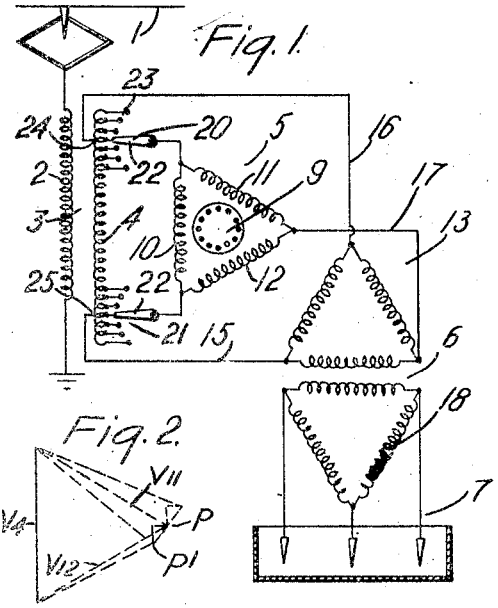
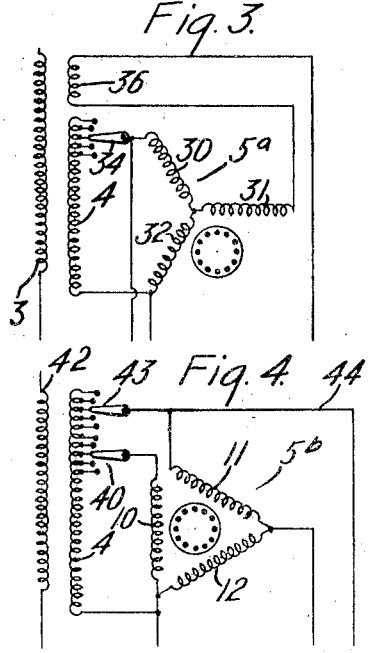
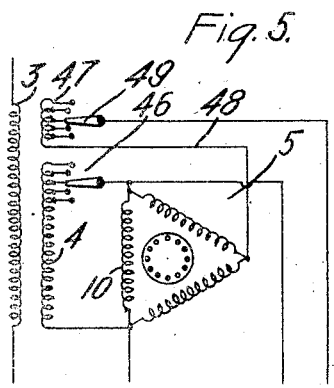
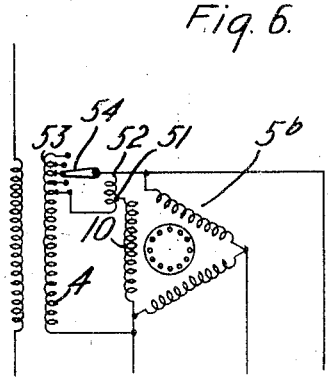
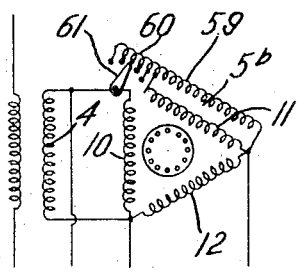
WITNESSES:
INVENTOR
Benjamin G. Lamme
BY
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION AND CONTROL.

1,246,617.  Specification of Letters Patent.  Patented Nov. 13, 1917.

Application filed March 23, 1914. Serial No. 826,630.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Systems of Distribution and Control, of which the following is a specification.

My invention relates to systems of distribution and control, and it has special reference to so called "phase converters" which are employed for converting single-phase energy into polyphase energy for the operation of polyphase induction motors.

The object of my invention is to provide a phase converter of the three-phase type for converting single-phase energy into three-phase energy, and to make provision for compensating for phase distortion and voltage changes under load conditions. In my co-pending application, Serial No. 808,714, filed December 26, 1913, means is disclosed and claimed for effecting these compensations in connection with a two-phase converter, and it is my purpose to provide means for accomplishing similar results in connection with three-phase converters.

In the accompanying drawing, Figure 1 is a diagrammatic view of a system embodying my invention, Fig. 2 is a vector diagram showing the relation of certain of the voltages of the system shown in Fig. 1, and Figs. 3, 4, 5, 6 and 7 are diagrammatic views of modified systems embodying my invention.

Referring to Fig. 1, a supply circuit conductor 1, such as a trolley conductor, is adapted to deliver single-phase energy to a primary winding 2 of a transformer 3, having a secondary winding 4 which is adapted to deliver energy to a phase converter 5 and to a dynamo-electric machine 6, which constitutes a driving motor and is governed through the agency of a liquid rheostat 7.

The phase converter 5 comprises a rotor 9 of the squirrel-cage type and a plurality of windings 10, 11 and 12 which are connected in delta and are disposed at 120° from each other. The driving motor 6 is a three-phase induction motor having its primary windings 13 connected to the transformer secondary winding 4 and to the junction of the converter windings 11 and 12 by conductors 15, 16 and 17. The driving motor secondary windings 18 are associated with the liquid rheostat 7 which is merely illustrative of any suitable device for controlling the amount of resistance connected in the motor secondary circuits. The winding 10 of the converter 5 is the exciting winding and is connected to the transformer secondary winding 4 by means of switching devices 20 and 21. These devices comprise movable contact members 22 which are adapted to coöperate with sets of stationary contact terminals 23 having connections to series of turns at the respective ends of the transformer secondary winding 4.

Under no-load conditions, the exciting winding 10 of the converter is connected to the points 24 and 25 of the transformer secondary winding 4 to which the conductors 15 and 16 are connected. Under these conditions, $V_4$, $V_{11}$ and $V_{12}$, respectively, represent the voltages of the transformer winding 4 and the converter windings 11 and 12, and balanced voltage conditions are established.

When the converter 5 is subjected to load, the point P moves to position $P^1$ by reason of the phase distortion and the voltage reduction which result.

In order to compensate for the phase distortion the members 22 of the switching devices 20 and 21 are moved in the same direction to corresponding taps of the transformer secondary winding 4. The voltage drop is corrected by moving one of the members 22 further to increase the excitation of the exciting winding 10 of the converter. To accomplish both results, therefore, it is necessary to manipulate both members 22 of the switching devices 20 and 21 in the same direction and to different degrees.

In case the dynamo-electric machine 6 is acting as a generator and returning energy to the supply circuit, the compensations for phase distortion and increase of voltage are effected by corresponding adjustments of the members 22 of the switching devices 20 and 21 in the opposite direction.

Referring to Fig. 3, a phase converter $5^a$ is provided with a plurality of three-phase windings 30, 31 and 32 which are connected in star relation. The windings 30 and 32 constitute the exciting windings of the converter and are connected across the transformer secondary winding 4, the active turns of which may be varied by a switching device 34. In this manner, the excitation of the converter may be varied to correct drops in voltage due to load, while the phase distortion, under load conditions, is compensated for by an auxiliary transformer secondary winding 36 which is connected in circuit with the converter winding 31 and is excited in phase with the main transformer 3. Thus, an out-of-phase voltage component is impressed upon the circuit of the converter winding 31 which accomplishes the desired result.

In Fig. 4, a phase converter 5ᵇ is employed which is provided with a plurality of windings 10, 11 and 12 which are connected in "open-delta." The winding 10 constitutes the exciting winding of the converter and is connected across a portion of the transformer secondary winding 4, and its excitation is varied by a switching device 40 by means of which the active turns of said transformer winding 4 may be adjusted. A portion 42 of the transformer secondary winding 4 is connected between the free ends of the converter windings 10, 12 and 11 through the agency of a switching device 43 which is connected to the winding 11 and to one of the motor conductors 44. The amount of out-of-phase correcting voltage may be adjusted to suit load conditions.

Reference may now be had to Fig. 5 in which a delta-connected phase converter 5 is employed, having its exciting winding 10 connected across the transformer secondary winding 4 and excited thereby. The amount or degree of excitation may be varied by a switching device 46, whereby the voltage of the converter may be adjusted to any desired amount. The phase displacement due to load may be compensated for by an auxiliary transformer secondary winding 47 which is excited in phase with the main transformer 3 and is connected to the motor conductor 48. A switching device 49 permits of adjustment.

In Fig. 6, a phase converter 5ᵇ, having its windings connected in "open-delta" relation, has one terminal of the exciting winding 10 connected to the lower end of the transformer winding 4, while the other terminal is connected to an intermediate point 51 of an auxiliary auto-transformer winding 52 which is adapted to be connected across any desired number of end turns 53 of the transformer secondary winding 4 by a switching device 54.

Under no-load conditions, the auxiliary auto-transformer winding 52 is short-circuited, as shown in the figure, but, when the converter is loaded, the switching device 54 is shifted to excite the auto-transformer 52 to the proper degree to concurrently and proportionally effect increases in voltage and corrections for phase distortion. With this arrangement of connections and apparatus, the voltage supplied to the driving motor (not shown) is also increased under load conditions.

With reference to Fig. 7, a three-phase converter 5ᵇ has its windings 10, 11 and 12 connected in "open-delta" relation and its exciting winding 10 in multiple relation to the transformer winding 4. An auxiliary auto-transformer winding 59 is connected across the converter winding 11 and is provided with a plurality of end turns 60 which are associated with a switching device 61 by means of which said end turns may be connected across the free ends, or the open connection, of the converter windings 10 and 11. Thus, corrections for phase displacement and voltage drop may be concurrently effected.

While I have shown and described my invention as embodying more or less specific arrangements of connections and classes of apparatus, it will be understood that other modifications than those set forth may be made without departing from the spirit and scope of my invention, as set forth in the appended claims.

I claim as my invention:

1. The combination with a source of single-phase energy and a three-phase converter for converting single-phase energy into three-phase energy, of switching means for varying the excitation of said converter and the phase position of its delivered voltage.

2. The combination with a source of single-phase energy and a three-phase dynamo-electric machine for converting single-phase energy into three-phase energy, of means for varying the excitation of said dynamo-electric machine and for adjusting the phase position of its delivered voltage.

3. The combination with a source of single-phase energy and a three-phase dynamo-electric machine for converting single-phase energy into three-phase energy and having windings connected in delta relation, one of said windings being excited from said source of energy, of means for varying the excitation of said winding and for changing the phase position of the delivered voltage.

4. The combination with a source of single-phase energy, and a three-phase dynamo-electric machine adapted to convert single-phase energy into three-phase energy, of switching devices for connecting one of the phase windings of said machine across said source of energy and for adjusting said connections to effect compensations for voltage reduction and phase distortion under load conditions.

5. The combination with a single-phase transformer winding, a three-phase converter for converting single-phase energy into three-phase energy, and three-phase load-circuit conductors respectively connected to one of the terminals of said converter and to the ends of said transformer winding, of switching devices for adjustably connecting the other terminals of said converter to the respective ends of said transformer winding in proximity to the load-circuit connections.

6. The combination with a source of single-phase energy and a three-phase dynamo-electric machine for converting single-phase energy into three-phase energy and having windings connected in delta relation, of a plurality of switching devices associated with the respective ends of one of said windings for adjustably connecting said winding across the single-phase source.

In testimony whereof, I have hereunto subscribed my name this 19th day of Mar. 1914.

BENJ. G. LAMME.

Witnesses:
F. T. HAGUE,
B. B. HINES.